United States Patent

[11] 3,631,710

| [72] | Inventor | David Lunifeld<br>Pittsburgh, Pa. |
|---|---|---|
| [21] | Appl. No. | 146 |
| [22] | Filed | Jan. 2, 1970 |
| [45] | Patented | Jan. 4, 1972 |
| [73] | Assignee | Gulf Research & Development Company<br>Pittsburgh, Pa. |

[54] METHOD AND APPARATUS FOR EVALUATING FUELS
7 Claims, 3 Drawing Figs.

| [52] | U.S. Cl. | 73/35 |
|---|---|---|
| [51] | Int. Cl. | G01n 33/22 |
| [50] | Field of Search | 73/35, 432;<br>123/73 AF |

[56] References Cited
UNITED STATES PATENTS

| 2,549,478 | 4/1951 | Kiekhaefer | 123/73 V |
|---|---|---|---|
| 2,773,489 | 12/1956 | Estes | 123/73 A X |
| 3,280,805 | 10/1966 | Muller | 123/73 X |

*Primary Examiner*—James J. Gill
*Attorneys*—Meyer Neishloss, Deane E. Keith and William Kovensky

ABSTRACT: Testing of a plurality of different two-cycle fuel oil mixtures in a single engine simultaneously is achieved. The conventional balance tube interconnecting the two-cycle engine's reed blocks is replaced by a composite surge chamber which permits pressure communication between the reed block assemblies while preventing any fluid flow communication between them.

PATENTED JAN 4 1972
3,631,710
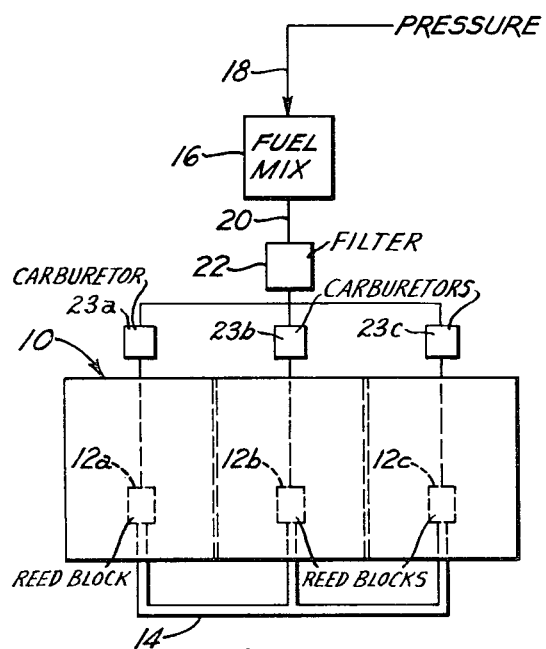
Fig.1 STANDARD
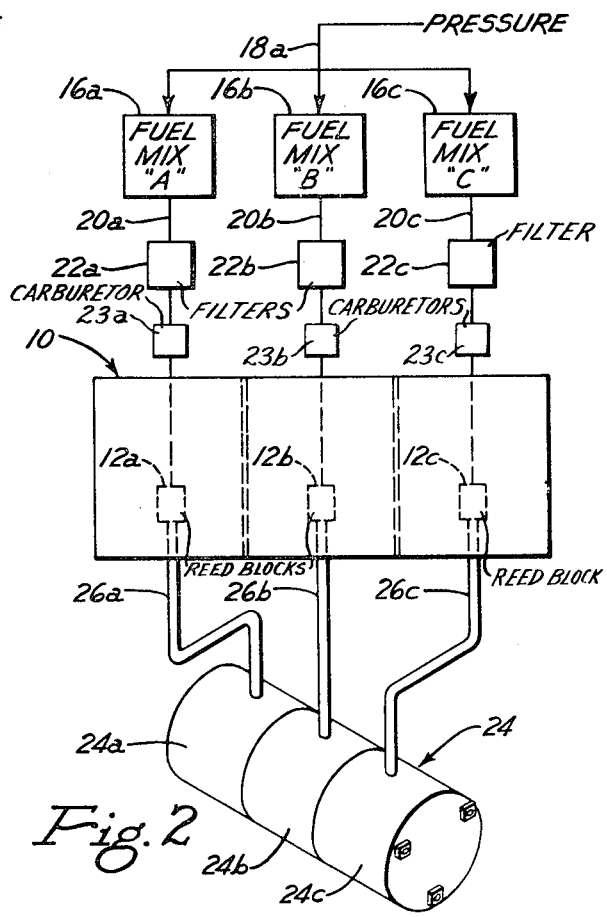
Fig.2
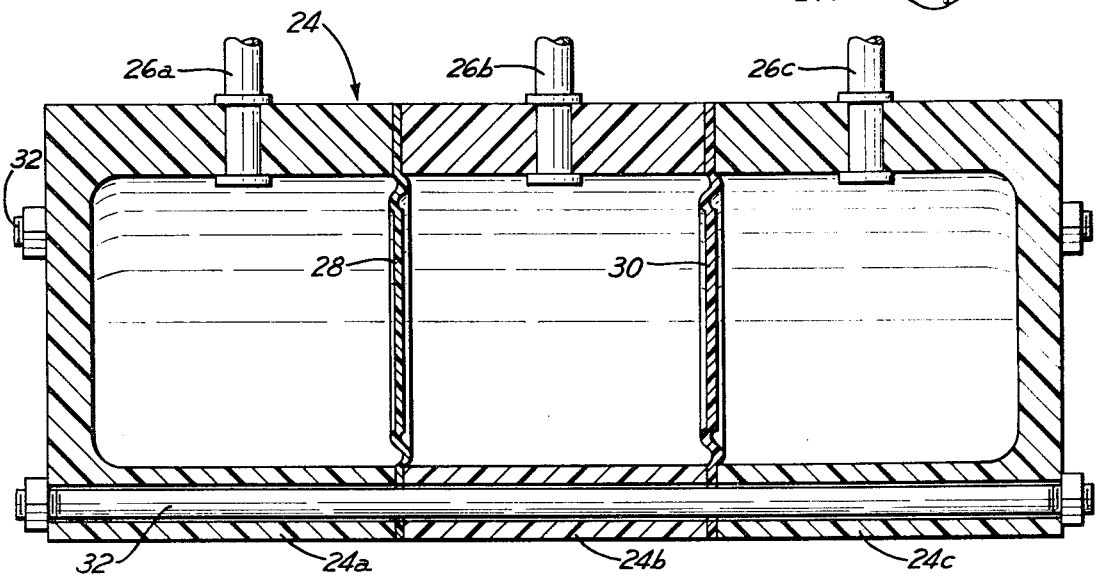
Fig.3
INVENTOR.
DAVID LUNIFELD

METHOD AND APPARATUS FOR EVALUATING FUELS

The invention pertains generally to the field of evaluation of fuel and fuel mixtures, and more specifically it is directed toward evaluation of gasoline and oil mixtures for use in two-cycle engines.

The invention concerns that type of fuel evaluation which seeks to compare long term effects of different fuels on the engine, as opposed to so-called performance tests wherein the qualities of a fuel are evaluated while the engine is running. In the testing techniques to which the invention pertains an engine is run with a test fuel for a relatively long predetermined time, and then the engine is disassembled to examine, in detail, the effects of burning the fuel in the engine, as well as the lubricating qualities of the oil. The criteria which are examined include kind of deposits created on the engine's parts, the amounts of such deposits, any corrosion which may have occurred on the engine's parts, any abrasive effects on the engine's parts, any ring sticking, and spark plug fouling.

Heretofore, this type of test was run in an engine, the engine disassembled, results evaluated, the engine cleaned, the engine reassembled using many new parts, and then another fuel run to start the cycle again. The above-outlined procedure suffers from the obvious disadvantage that a long period of time is required for testing only one fuel, the cost of the new parts needed for each test is relatively high, and that a relatively large amount of labor is required for testing that one fuel. Further, depending upon the quality of the cleaning and of the reassembling job from test to test, each fuel may not be subjected to exactly the same conditions. Additionally, each fuel could be subject to different environmental conditions, such as ambient temperature, engine speed, cavitation or other effects at the "load" end of the engine, and the like.

The present invention provides a method and apparatus to overcome all of the above disadvantages by providing means to test a plurality of fuels in a single engine simultaneously. Heretofore, the closest approximation of the results obtained by the present invention include either the use of three identical engines, or else sequentially supplying different fuels to the same engine. Running different fuels in identical engines at the same time does save running time, that is, more than one fuel is tested in the same number of elapsed hours, but does not save any labor because three engines must be disassembled, cleaned, and reassembled. Further, a triplication of test equipment is needed. Running more than one fuel sequentially through one engine suffers from the disadvantage that the effects of the various fuels become mixed together and it becomes virtually impossible to make comparisons of one fuel versus another.

The invention provides means to separate the fuels from each other while they are being run in the same engine. In multicylinder, two-cycle engines, such as those used in marine applications, a plurality of separate sealed compartments for each cylinder in a common crankcase, separate carburetors and fuel systems are commonly provided. Separate sealed crankcase compartments, carburetors, and fuel systems are provided or effectually provided to maximize the power produced by the engine. Thus, this part of such engines naturally lends itself to use in the present invention. However, the separate cylinders are usually in communication with each other by means of reed valves to permit a predetermined amount of flow of the fuel/oil mixture between the cylinders for the purposes of providing smooth operation when idling, and to prevent damage to the reed valves throughout the operational range. This intercommunication between cylinders would destroy the integrity of the separate evaluation of different fuel mixtures supplied to the different cylinders or banks of cylinders in one engine if left unmodified. In the engine used in developing the invention the communication between the reed valves which is required for normal engine operation, as mentioned above as is known to those skilled in the art, is accomplished by means of tubing interconnecting all the reed valves. This tubing is known as the balance tubes or pressure balance tubes of the engine. In other conventional engines this communication is provided by using a common manifold, or in other ways.

In accordance with the teachings of the present invention, such an engine is modified by having the balance tubes removed and replacing them with separate surge chambers or pressure transmitters which are interconnected by means of flexible diaphragms so that the pressure can communicate across the reed valves or reed block assemblies one to the other, while at the same time the reed block assemblies are held physically isolated from each other so that the fuels do not intermix.

It is anticipated that further research will show that some properties of four cycle (Automotive Oils) such as deposit-induced preignition, spark plug performance, combustion chamber deposits, and piston varnish characteristics, may be able to be evaluated using the present invention.

The above and other advantages of the invention will be pointed out or will become evident in the following detailed description and claims, and in the accompanying drawing also forming a part of the disclosure, in which:

FIG. 1 is a diagrammatic showing of a multicylinder, two-cycle internal combustion engine arranged in the conventional manner for test purposes;

FIG. 2 is a view similar to FIG. 1 of the same engine showing the modifications necessary for the practice of the invention; and FIG. 3 is a longitudinal cross-sectional view through the composite pulse chamber or surge chambers of the invention.

Referring now in detail to the drawing, there is shown in FIGS. 1 and 2 an engine 10 arranged, in FIG. 1, in the conventional manner for testing a fuel mixture, and in FIG. 2 in accordance with the present invention to simultaneously test three different fuel mixtures.

In this specification the invention will be described in conjunction with a 100 horsepower six-cylinder marine outboard engine. In the successfully built embodiment of the invention the engine was manufactured by the Kiekhaefer Mercury Company, a division of Brunswick Corporation, their Model No. MERC 1000SS, and sold under the trademark "Mercury." The engine is supplied by the factory with three carburetors each feeding a bank of two adjoining cylinders via their common reed block. In this particular engine, the reed blocks serve as inlet valves to the crankcase and thence to the cylinders, and also serve as bearings for the crankshaft. This part is called a "valve type, main bearing assembly" by the manufacturer. However, the terms "reed block assembly," "reed valve," "reed block," and the like as used in the specification and claims herein shall be understood to mean any sort of inlet reed valve means of a two-cycle engine with which the invention may be used. There is a separate sealed crankcase compartment for each cylinder. Each bank of two cylinders is associated with a dual reed valve or reed block 12a, 12b and 12c. The three reed blocks 12 are interconnected by a balance tube 14 which permits pressure pulses from each reed valve to communicate with the pressure pulses of the other reed valves, to permit proper operation of the engine in a manner well known to those skilled in the art. Only parts of the engine and fuel system necessary to understand the operation of the invention have been shown, it being understood that all other parts remain unchanged and are conventional. Thus the conventional fuel system with the three carburetors is fed by a tank 16 containing the fuel mixture. A fuel pump or house air is provided to pressurize the fuel and drive it to the carburetors 23. This pressure force is represented by the arrow 18. A line 20 delivers the fuel mixture via a filter 22, and the the line 20 breaks into three branches to feed the three carburetors and 23a, 23b, and 23c. From each carburetor 23a, 23b or 23c, the fuel/air mixture is fed to a reed block assembly 12a, 12b and 12c, each of whose reed valves control the entry of the fuel/air mixture into the crankcase compartments of a bank of two adjoining cylinders.

The engine shown represents the one successfully used in testing the invention, but it is exemplitive only. For example, the invention could be used to test two fuels in a four-cylinder engine, if the four cylinders were divided into two banks of two cylinders each and each bank was also served by a separate carburetor and reed block. This type of engine is commercially available. Similarly, other four-cylinder engines could be used to simultaneously test four fuels if each of the cylinders, carburetor and reed blocks was so separated from the others. Such an engine is commercially available, and could be made to so operate by suitable modifications. Thus, a number of fuels equal to the number of cylinders can be tested so long as the fuel systems are kept physically isolated from each other. The provision of a composite surge chamber having an appropriate number of separate sections, in accordance with the teachings of the invention, is instrumental in achieving the necessary physical separation.

Application of the present invention to four-cycle engines for testing fuels only is not deemed feasible. The primary reason is that the usual four-cycle engine, such as for automotive use, has a common crankcase, as well as a common intake manifold. These two facts, and others prohibit easily providing total separation of each cylinder or bank of cylinders with respect to each other so as to permit using such engines in accordance with the invention. In two-cycle engines it is primarily the actual or effectual separate crankcases conventionally provided for each cylinder which permits the simple modifications needed to use such engines for testing fuel mixtures in accordance with the invention.

As to the terms "fuel mixture" or "fuel" as used herein, it will be understood that, depending on the engine used, the fuels supplied may be actually mixtures of gasoline and lubricating oil and the differences between them may be merely differences in ratio. On the other hand, the same gasoline can be used in the same ratio with a number of different oils in order to test the oils. Exactly the reverse can be done to test gasolines. It may even be possible, with the proper engine and other conditions, that the "fuel mixture" may not be a mixture at all, but pure gasoline or pure oil. Thus, the term "fuel mixture" should be very broadly construed to include anything which can be used to power an engine adaptable for use with the invention.

Referring now to FIG. 2 there is shown the engine 10 of FIG. 1 modified to simultaneously test three fuels marked fuel mixtures "A" "B" and "C." In place of the tank 16 there are provided three separate tanks 16a, 16b, and 16c. In place of the pressure line 18 there is provided a similar pressure line 18a having three branches to separately but equally pressurize the fuel mixture in each of the three tanks. In place of the line 20 there is provided a separate line 20a, 20b and 20c, each of which includes its own filter 22a, 22b and 22c and the appropriate one of the three carburetors 23a, 23b and 23c. The balance tube 14 is eliminated, and in its place there is provided a composite surge or pressure chamber 24 having three separate chambers 24a, 24b and 24c. Each reed block 12a, 12b and 12c is connected to its respective chamber 24a, 24b and 24c by a separate line 26a, 26b and 26c.

In developing the present invention the exceedingly simple idea of removing the balance tube 14 and plugging the openings was tried in order to achieve physical separation of the fuel mixtures. The results were not satisfactory. Under speeds of 1,500 r.p.m. the engine ran very roughly, or not at all. At full throttle, the engine ran satisfactorily, but a failure was experienced after only about 2 hours. Thus it is thought that not only physical separation is necessary, but that the pressure communication, as is provided by the balance tube 14, must be maintained for fully satisfactory operation.

Referring to FIG. 3, the composite surge chamber 24 is shown in detail. In the successfully built embodiment of the invention, chamber 24 was machined from a solid bar of Lucite having a diameter of about 2½ inches. The two end chambers 24a and 24c are of similar cuplike configuration. The center chamber 24b is of tubelike configuration. A pair of flexible diaphragms 28 and 30 formed of neoprene are provided, with diaphragm 28 between chambers $a$ and $b$ and diaphragm 30 between chambers $b$ and $c$. The entire assembly of the three chambers and the two diaphragms are held tightly together in a fluidtight manner by three through bolts 32, which pass through suitably formed registering openings in the three chambers and the two diaphragms. Suitable means, not shown, are provided to form a fluidtight connection at the juncture of each of the lines 26 and their respective chambers, and on both sides of the diaphragms.

The form of the surge chamber 24 shown in FIGS. 2 and 3 is that which has been built and successfully used. However, the criteria in constructing such a chamber are that the fuel be physically separated and that pressure communication between the reed blocks be maintained. Many different forms of pressure chambers could be built to accomplish these ends, as will be evident to one skilled in the art. For example, the simplest in concept structure would be to provide separate diaphragms in the balance tube 14 of FIG. 1, one in each of the vertical legs, vertically disposed in the drawing, which connect to the common horizontal leg. Another form would be to provide three separate pressure cells in either a "star" or "triangle" configuration in such a way that pressure surges or pressure pulses in one of the cells would be experienced across the diaphragm means in the other two cells simultaneously.

In operation, after modifying and assembling an engine in accordance with FIG. 2 and the teachings hereof, the operator need simply provide three different fuel mixtures in the three tanks 16a, 16b and 16c, and then run the engine for some predetermined testing time, 100 hours is typically used. At the end of the running time, the engine is disassembled; and examination of the cylinder block, pistons, connecting rods, and all the other parts, side by side, very graphically illustrates and relative qualities of the three fuels one versus the others as to deposits, varnish accumulation, wear and the like criteria. Only one disassembly, cleaning and reassembly operation is needed to test three fuels. Engine conditions, and environmental factors including atmospheric conditions, were identical because the three fuels were actually run in the same engine at the same time.

While the invention has been described in detail above, it is to be understood that this detailed description is by way of example only, and the protection granted is to be limited only within the spirit of the invention and the scope of the following claims.

I claim:

1. A method of simultaneously evaluating a plurality of different two-cycle fuels in a single multicylinder two-cycle engine which has a number of separate fuel systems and reed block assemblies, comprising the steps of separately feeding a different fuel to be tested to each of said reed blocks, preventing fuel flow between the reed blocks, permitting pressure communication between the reed blocks, running the engine on all of said different fuels, and comparing the effects of said different fuels on said engine.

2. In a multicylinder two-cycle engine for simultaneously evaluating a plurality of fuels, wherein the engine comprises a plurality of separate fuel systems and reed block assemblies, the improvement comprising replacing the balance tube interconnecting said plurality of reed block assemblies with means to permit pressure communication between said reed block assemblies and to prohibit fuel flow communication between said reed block assemblies.

3. The combination of claim 2, said permitting and prohibiting means comprising a composite surge chamber having a number of chambers equal to the number of reed block assemblies with flexible diaphragm means separating the chambers from each other.

4. The combination of claim 3, conduit means interconnecting each of said chambers with each of said reed block assemblies.

5. The combination of claim 3, said composite surge chamber comprising a pair of end chambers and a center chamber arranged in tandem with a flexible diaphragm between each end chamber and one side of said center chamber.

6. The combination of claim 5, said chambers being fabricated of Lucite bar stock.

7. The combination of claim 5, said diaphragm consisting of neoprene.

* * * * *